US009957465B2

(12) United States Patent
Lofquist

(10) Patent No.: US 9,957,465 B2
(45) Date of Patent: May 1, 2018

(54) PREPARATION OF STEARIC ACID

(71) Applicant: Magnus International Group, Inc., Chagrin Falls, OH (US)

(72) Inventor: Eric E. Lofquist, Novelty, OH (US)

(73) Assignee: Magnus International Group, Inc., Chagrin Falls, OH (US)

( * ) Notice: Subject to any disclaimer, the term of this patent is extended or adjusted under 35 U.S.C. 154(b) by 0 days. days.

(21) Appl. No.: 15/590,595

(22) Filed: May 9, 2017

(65) Prior Publication Data
US 2017/0321149 A1 Nov. 9, 2017

Related U.S. Application Data

(60) Provisional application No. 62/333,473, filed on May 9, 2016.

(51) Int. Cl.
| | |
|---|---|
| *C07C 51/36* | (2006.01) |
| *C11C 1/00* | (2006.01) |
| *C11C 1/04* | (2006.01) |
| *C11C 1/06* | (2006.01) |
| *C11C 1/08* | (2006.01) |
| *C11C 1/10* | (2006.01) |
| *C11B 7/00* | (2006.01) |
| *C11C 3/12* | (2006.01) |
| *C11B 3/12* | (2006.01) |

(52) U.S. Cl.
CPC ............ *C11C 1/005* (2013.01); *C11B 3/12* (2013.01); *C11B 7/0075* (2013.01); *C11C 1/04* (2013.01); *C11C 1/06* (2013.01); *C11C 1/08* (2013.01); *C11C 1/10* (2013.01); *C11C 3/123* (2013.01)

(58) Field of Classification Search
CPC ...... C11C 1/00; C11C 1/04; C11C 1/06; C11C 1/08; C11C 1/10; C11C 3/12; C11C 1/005; C11C 3/123; C11B 3/12; C11B 7/00
USPC .......................................... 554/141
See application file for complete search history.

(56) References Cited

U.S. PATENT DOCUMENTS 1,659,790 A * 2/1928 Starrels .................. C11C 1/02
554/142

* cited by examiner

Primary Examiner — Deborah D Carr
(74) Attorney, Agent, or Firm — Tucker Ellis LLP; Michael G. Craig

(57) ABSTRACT

One or more techniques are disclosed for a process of preparing stearic acid from animal and/or plant sources may comprise: 1) deodorizing and distilling a fat; 2) concentrating fatty acids of the fat; and 3) hydrogenating the fatty acid to provide stearic acid. The process may include the use of co-products from plant and/or animal sources. The process may also include distilling the stearic acid to provide palmitic acid and/or fully hydrogenated fatty acid. Tallow fatty acid, vegetable fatty acid, stearic acid, and palmitic acid prepared from the process described are also disclosed.

15 Claims, 4 Drawing Sheets

PREPARATION OF STEARIC ACID

This application claims priority to U.S. Provisional Application No. 62/333,473, entitled PREPARATION OF STEARIC ACID, filed May 9, 2016, which is incorporated herein by reference.

BACKGROUND

Stearic acid (also known as octadecanoic acid) is a saturated fatty acid with a 18-carbon chain. Stearic acid may be found in fats and oils from both animals and plants. Stearic acid may be used in a variety of applications, including but not limited to food products, animal products, personal care products, candles, fireworks, and plastics manufacturing as a lubricant and release agent. Stearic acid can be prepared like most fatty acids. The typical steps involved in the manufacture of stearic acid may include: 1) hydrolysis of a fat or oil to produce a mixture of fatty acids and glycerine; 2) separation of the fatty acids and glycerine; and 3) purification and separation of fatty acid mixtures into two or more fatty acid mixtures.

Palmitic acid (also known as hexadecanoic acid) is a saturated fatty acid with a 16-carbon chain. Palmitic acid may be found in fats and oils from both animals and plants. Palmitic acid may be used in a variety of applications, including but not limited to food products, animal products, personal care products, and release agents. Palmitic acid can be prepared like most fatty acids, such as those described above for stearic acid.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques are disclosed for a process of preparing stearic acid from animal and/or plant sources may comprise: 1) deodorizing and distilling a fat; 2) concentrating fatty acids of the fat; and 3) hydrogenating the fatty acid to provide stearic acid. The process may include the use of co-products from plant and/or animal sources (e.g., such as products that may be a by-product of one process (e.g., waste), and used as a feedstock for another process). The process may also include distilling the stearic acid to provide palmitic acid and/or fully hydrogenated fatty acid. Tallow fatty acid, vegetable fatty acid, stearic acid, and palmitic acid prepared from the process described are also disclosed.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1A:
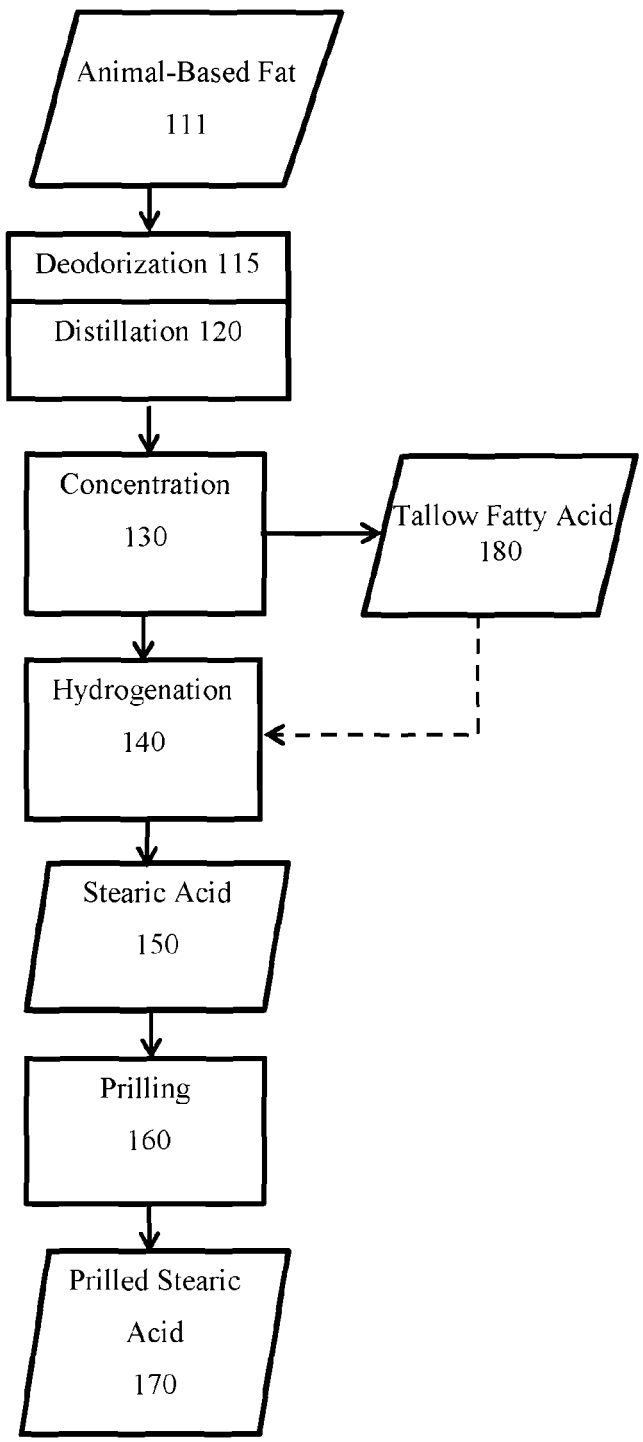
FIG. 1A is a flow diagram of the process showing the preparation of tallow fatty acid and stearic acid from an animal-based fat.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Stearic acid is a mixture of fatty acids composed primarily of stearic and palmitic acids. It is a hard, wax-like saturated fatty acid. Stearic acid may be produced in various grades, depending on the end application. Stearic acid may be used in rubber, pharmaceuticals, cosmetics, food packaging, soap, detergents, surfactants, coatings, lubricants, and textiles. Rubber grade stearic acid may be used as a dispersing agent in the manufacture of rubber or other industrial type applications. Generally, rubber grade stearic acid may have a lower C:18 content than other grades of stearic acid, for example about 20% to about 65% stearic acid by weight. Stearic acid may also be produced with a higher stearic acid content for other applications. For example, higher grade stearic acids may be about 70% stearic acid to about 90% stearic acid by weight.

The two steps involved in the manufacture of stearic acid may include: 1) hydrolysis (e.g., also known as saponification) of a fat or oil to produce a mixture of fatty acids and glycerine, followed by separation of fatty acids and glycerine (e.g., also called Acidulation); and 2) purification and separation of fatty acid mixtures into two or more fatty acids. The purification and separation process may include distillation. Other methods used to produce stearic and other fatty acids include solvent crystallization, hydrogenation, and distillation.

Figure 1B:
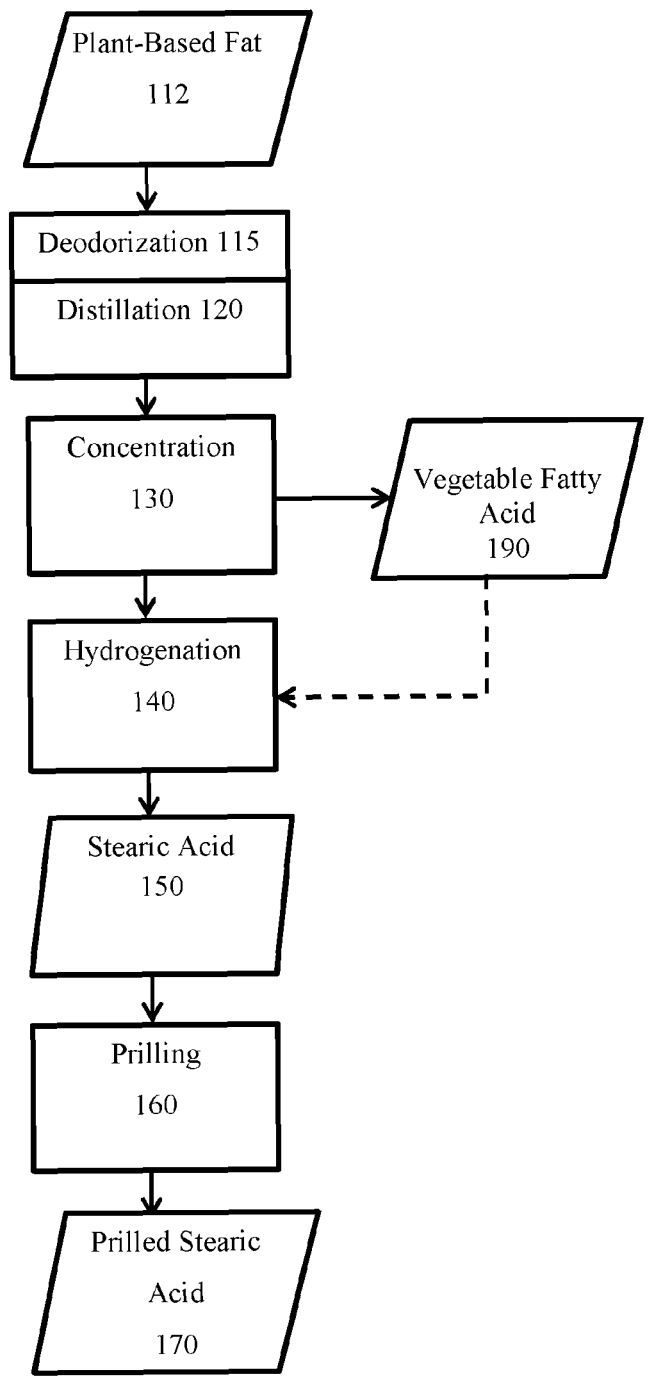
FIG. 1B is a flow diagram of the process showing the preparation of tallow fatty acid (e.g., or tallow equivalent) and stearic acid from a plant-based fat.

In the process illustrated in FIGS. 1A and 1B, stearic acid 150 may be produced by: 1) deodorizing and distilling a fat; 2) concentrating fatty acids of the fat; and 3) hydrogenating the fatty acid to provide stearic acid. In the processes described herein, stearic acid, palmitic acid, and fully hydrogenated fatty acid may be produced from different sources of fat, and may also be produced without the use of hydrolysis.

The source fat provided in the process described in FIGS. 1A and 1B may include fats or oils. In one implementation, the source fat (e.g., feedstock for the process) may originate from animal-based sources 111. The fat from the animal-based sources may be referred to as tallow, for example, or a tallow equivalent. In another implementation, the source fat may originate from plant-based sources 112.

Animal-based fat 111 may be provided from one or multiple animal sources. In one implementation, the animal-based sources may include chickens, pigs, cattle, goats, lambs, ducks, geese, horses, and fish.

Plant-based fat 112 may be the source fat, as in FIG. 1B. In one implementation, the plant-based sources 112 may include vegetables. In another implementation, the plant-based sources 112 may include flowers, grasses, and other vegetation. In yet another implementation, the plant-based sources 112 may include seeds.

In one implementation, the source fat may originate from a combination of animal-based fat 111 and plant-based fat 112 sources. In another implementation, the process described herein may be subject to the availability of the sources (e.g., either animal-based fat 111 or plant-based fat 112) of the source fat. In another implementation, the source fat may also contain water.

In yet another implementation, the source fat may originate from a co-product or secondary material source. In one implementation, the source fat may originate from a surplus source, or a co-product that may typically be disposed of or discarded. In one implementation, the source fat may be a non-conforming result of a process to make other products (e.g., does not meet specifications). In one implementation, the source fat may originate from a co-product source, such as source product that may be a by-product of one process, and used as a feedstock for another process. In one implementation, the source fat from the co-product source may be used in the process described herein, for example, instead of incurring a cost for disposal of the co-product fat (e.g., which may occur if the by-product is a waste product). For example, disposal of an unused co-product source may include fat that is incinerated or sent to a landfill.

In another implementation, the source fat may originate from animal-based fat 111, as described in FIG. 1A. The animal-based fat 111 may be provided from various sources. In one implementation, the animal-based fat 111 may be provided from farms and slaughterhouses. In one implementation, the animal-based fat 111 may be provided from restaurants, cafeterias, food processing facilities, and other commercial kitchens where food is prepared. In another implementation, the animal-based fat 111 may be provided from a co-product source.

In FIG. 1B, a process for producing stearic acid 150 from plant-based fat 112 is described. In one implementation, the plant-based fat 112 may be provided from plant, for example, including seeds and other vegetation. In another implementation, the plant-based fat 112 may be provided from plant-based oils. In yet another implementation, the plant-based fat 112 may be provided from a co-product source.

In the processes described herein, the source fat may be processed similarly whether it may be provided from animal sources, plant sources, or a combination of the two (described below).

In the example processes illustrated in FIG. 1A or FIG. 1B, the source fat, either animal-based fat 111 or plant-based fat 112, may undergo deodorization 115 and distillation 120. In the deodorization step 115, for example, the source fat may be heated (e.g., to approximately 300 degrees Fahrenheit), and placed under a vacuum (e.g., partial up to a full vacuum). In this example, light constituents may be removed from the product, resulting in a deodorized product (e.g., at least partially). During this deodorization step 115, undesirable odors associated with the fat may be reduced or removed.

The distillation step 120 can be configured to remove some contaminants. In one implementation, the contaminants may include water. In another implementation, the contaminants may include food, dirt, secondary materials, or other contaminants. As an example, due to potential sensitivity of fatty acids to heat, distillation may be conducted at an appropriate temperature that is practical for the desired product and process, balanced with a practical time for the fatty acid disposed in the distillation unit. Often, a distillation process may balance application of a vacuum (e.g., a partial vacuum imparting low pressure, up to a full vacuum imparting higher pressure), practical heating, and short contact times, which can be based on the type of source fatty acid (e.g., animal and/or vegetable), and the desired specification of resulting distilled fatty acid. In one implementation, distillation may occur at about 250° F. (120° C.) to about 300° F. (148° C.). In another implementation, the distillation may occur under a partial vacuum. In another implementation, the distillation under a partial vacuum may have a pressure of about 5 mm Hg or less. In one implementation, the moisture content may be reduced to about 0.3% by weight or less. In another implementation, the moisture content may be reduced to about 1.0% by weight or less. In another implementation, the moisture content may be reduced to about 0.2% by weight or less.

In other implementations, such as batch distillation at atmospheric pressure, a distillation pot is can be charged with the source fatty acid and heated to a range of 260° to 316° C. (e.g., 500° to 601° F.). Further, in some implementations, the distillation technique may include working at reduced pressure, such as a range of five to fifty millimeters of mercury (5-50 mm Hg), and the source fatty acid can be heated to a range of 200° to 350° F. (e.g., 93° to 177° F.). In another implementation, the distillation may be performed under very low pressure (e.g., as high a vacuum as practicable), and the source fatty acid can be heated to a range of 400° to 500° F. (e.g., 204° to 260° C.). In other implementation such as continuous distillation, a preheated source fatty acid feed can flow through a series of heated reaction chambers, for example, which may be further heated by steam. In this implementation, a low pressure (e.g., partial vacuum) in the reaction chamber and the temperature of the feed can result in relatively instantaneous distillation of the fatty acids. In this implementation, a partial vacuum can be maintained at a range of approximately thirty to thirty-five mm Hg, and the temperature from 196° to 260° F. (e.g., 91° to 127° C.). As an example, residence time of the fatty acids in the reaction chambers may be about thirty minutes. In other implementations, different fatty acid distillation methods may be employed, which are well known in the art, such as fractional distillation, reactive distillation, and molecular distillation.

In this example implementation, the result of the deodorization 115 and distillation 120 steps, is a concentration 130 of the fatty acids 180, 190 from the source fat 111, 112. The concentration 130 of the fatty acids 180, 190 may occur through a vacuum distillation process. As an example, the vacuum distillation process may occur in a range of less than ten (10) mm Hg to one-hundred and eighty (180) mm Hg. In one implementation, the vacuum distillation may occur at a temperature at least about 400° F. (200° C.); however, for example, the temperature may be disposed in a range of about 196° to 500° F. (e.g., 91° to 260° C.), depending on the desired moisture content, length of exposure, and/or the amount of vacuum applied. In another implementation, a distillation tower or distillation column may be used. In another implementation, a vapor stream condensation may be used to concentrate the fatty acids. In one implementation, the concentrated fatty acids from the source fat 111, 112 may be at least about 90% of the product from this step. In another implementation, the concentrated fatty acids 180, 190 may be at least about 96% of the product from this step. The concentrated fatty acids 180, 190 may be provided as a tallow fatty acid (e.g., or a tallow equivalent) product or a plant-based fatty acid product, depending on the source of the fat. In one implementation, the concentration 130 of the fatty acids described in this step may occur through a continuous process, such as described above. For example, this process can be used to separate the fatty acids, glycerol, and triglyceride products.

After the concentration, a tallow fatty acid 180 may be provided (see FIG. 1A) when an animal-based fat 111 is used. In one implementation, the tallow fatty acid 180 may comprise a mixture of fatty acids. In one implementation, such a mixture can comprise palmitic acid (C16 or $CH_3(CO_2)_{14}COOH$) at approximately twenty-five to thirty percent (25-30%) of the material. Further, in this implementation, such a mixture can comprise stearic acid (C18 or $CH_3(CO_2)_{16}COOH$) at approximately fourteen to seventy-five percent (14-75%). In another implementation, after fractional distillation, such a mixture can comprise stearic acid at greater than or equal two ninety percent (≥90%) of the material.

After the concentration, a vegetable fatty acid 190 may be provided (see FIG. 1B) when a plant-based fat 112 is used. In one implementation, the vegetable fatty acid 190 may comprise a mixture of fatty acids from vegetable-based oils (e.g., soya-based, or other oils). In one implementation, such a mixture derived from vegetable-based oils may comprise palmitic acid at greater than or equal two eighty percent (≥80%) of the material.

Further, in the examples of FIGS. 1A and 1B, a hydrogenation 140 step may occur. In one implementation, the feedstock for the hydrogenation 140 process can comprise the resulting concentrated fatty acid 180, 190. In the hydrogenation step 140, hydrogen is added to saturate the compounds. In both FIGS. 1A and 1B, hydrogenation 140 can result in stearic acid 150, for example, comprising a fully saturated fatty acid. Hydrogenation 140 may convert the fatty acid product 180, 190, from the concentration 130 step, to stearic acid 150. In one implementation, hydrogenation 140 may include the addition of hydrogen gas to the fatty acid product, resulting in the stearic acid 150. In another implementation, a catalyst may be used in addition to the hydrogen gas to convert the fatty acid product to stearic acid 150 during hydrogenation 140. In one implementation, a nickel-based catalyst may be introduced in the reaction chamber in the presence of hydrogen to initiate the hydrogenation process, thereby turning the unsaturated stearic acid into a saturated fatty acid (e.g., fully hydrogenated tallow fatty acid).

During the hydrogenation 140 process, the iodine value (e.g., a measurement that may be indicative of an amount of unsaturated fatty acids) may be reduced. For example, the American Oil Chemists' Society official Iodine Value of Fatty Acids testing method, Tg 1a-64, which uses the Wijs iodine method, can be used to identify the iodine value of a target product. Using this method, for example, the iodine value identifies the amount of iodine in grams consumed by one-hundred grams of a fatty acid. A higher iodine number correlates to a higher unsaturated fatty acid content (e.g., and lower saturated fat content), where a lower number is indicative of a more saturated fatty acid content (e.g., and higher unsaturated fat content). In one implementation, using the hydrogenation step 140, the iodine value may be reduced from a level of about 125 cg l/g sample (e.g., or 45-70 cg l/g) to a lower level of about 10 cg l/g or less per sample. In another implementation, the iodine value may be reduced to a lower level of about 2.0 cg l/g or less per sample, for example, for a product fractionated from tallow to a greater than or equal to ninety percent stearic acid product. Additionally, in another implementation, the iodine value may be reduced to a lower level of about 1.0 cg l/g or less per sample, for example, for a practically, fully hydrogenated tallow fatty acid product.

The stearic acid resulting from the hydrogenation 140 can comprise a variety of purity levels. In one implementation, the stearic acid 150 may be rubber grade stearic acid. In another implementation, the stearic acid 150 produced may be at least 90% stearic acid. In another implementation, the stearic acid 150 produced may be at least 80% stearic acid. In yet another implementation, the stearic acid 150 produced may be at least 70% stearic acid.

Figure 2:
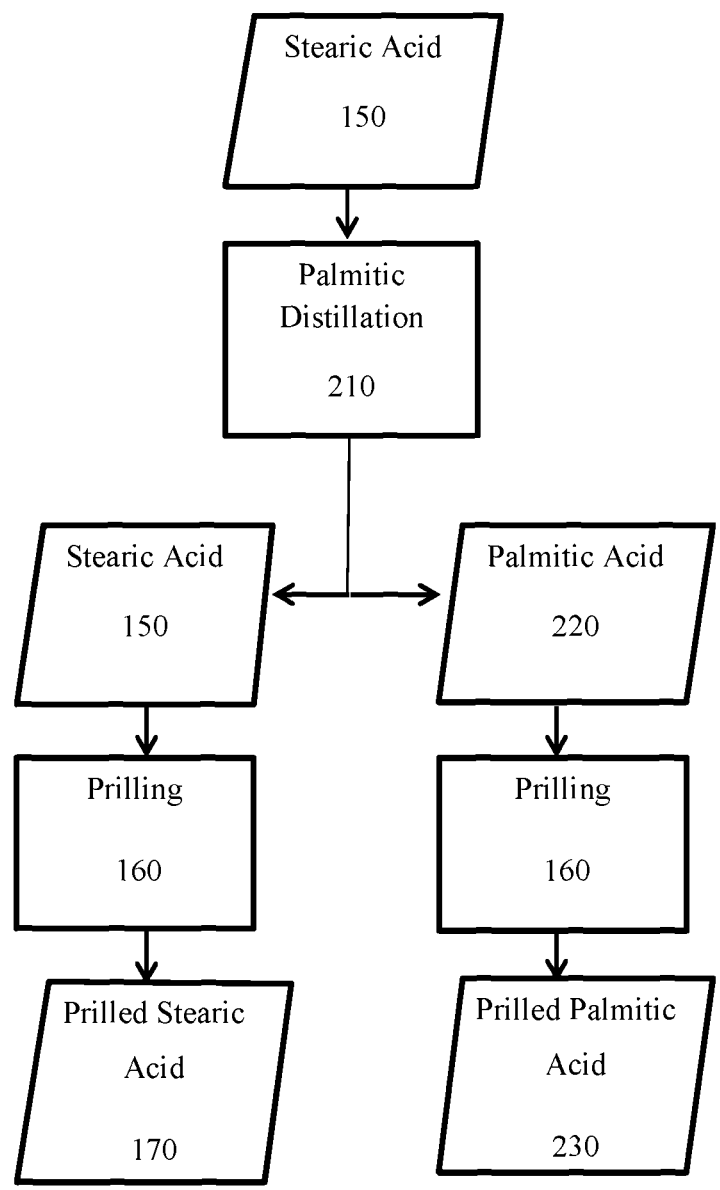
FIG. 2 provides a flow diagram showing the process of preparing palmitic acid, which is disclosed herein.
Figure 3:
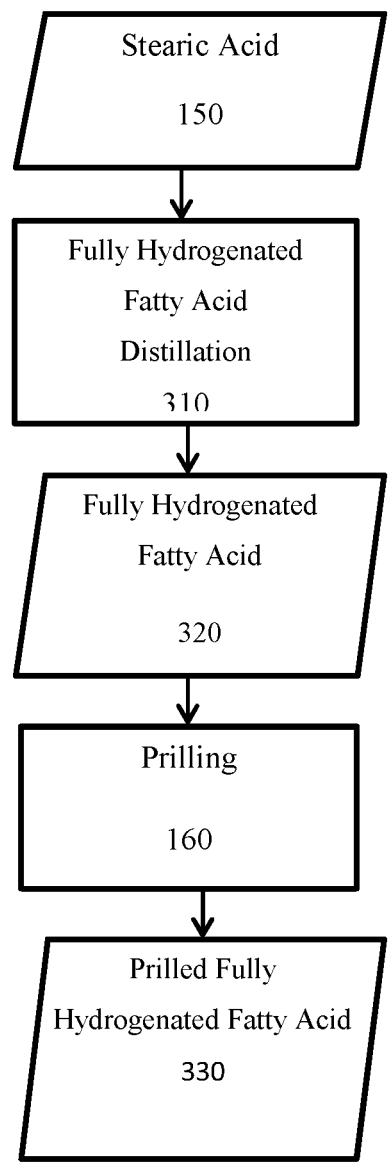
FIG. 3 provides a flow diagram showing the process of preparing fully hydrogenated fatty acid, which is disclosed herein.

After the hydrogenation 140 process, additional processes may occur. The process may also include distilling the stearic acid 150 in order to provide other products. In one implementation, stearic acid 150 may be distilled to produce palmitic acid as shown in FIG. 2. In another implementation, stearic acid 150 may be distilled to produce fully hydrogenated fatty acid as shown in FIG. 3. In yet another implementation, stearic acid 150 may be distilled to produce both palmitic acid and fully hydrogenated fatty acid.

Additionally, the stearic acid 150 may undergo prilling 160. Prilling 160 the stearic acid 150 may provide prilled stearic acid 170. A prilling process 160 can result in a pelletized version of a material, for example, a small aggregate or globule of the material, typically comprising a solid sphere, which can be formed from a melted liquid. Prilling 160 may provide for easier handling in certain applications. During the prilling 160 process, a liquid form of the fatty acid 150 (e.g., at up to 10° F. above the melting point of the fatty acid) can be introduced into a chamber that is at a desired prilling temperature; where the desired temperature allows the liquid to solidify into a small aggregate or globule of prilled fatty acid 170. For example, a desired prilling temperature (e.g., in a prilling chamber) may comprise about 30° to about 50° Fahrenheit (e.g., about -2° to about 10° Celsius). Further, in one implementation, the prilling chamber may comprise a countercurrent (e.g., counter to the flow of the liquid stearic acid) of air flow, which may also be chilled to the desired prilling temperature. In this example, the liquid fatty acid can be introduced at a top of a chilled prilling chamber (e.g., tower), a chilled air flow can be introduced to the chamber, and a resulting prilled fatty acid 170 is produced.

With respect to the process described in FIGS. 1A and 1B, the source fat utilized by the process may also contain both animal-based fat 111 and plant-based fat 112. In one implementation, the animal-based fat 111 and plant-based fat 112 may comprise a product know as brown grease, or trap grease. Brown grease, or trap grease, may contain water and other contaminants, but also high levels of free fatty acid. Brown grease may originate from plant or animal sources or a combination of multiple sources. Brown grease may also contain other contaminants such as water, dirt, food, secondary materials, and other materials. Often, brown grease is pumped out of collection stations (e.g., also called grease traps or grease barrels, or tanks) and disposed of in landfills or incinerated. Additionally, brown grease types, amounts and mixtures may vary from location to location. Although brown grease may be a co-product material that comprises a variety of components, it may also comprise a mixture of high-value hydrocarbons (e.g., fatty acids), which may be used in one or more of the processes described herein. For example, brown grease may be utilized in one or both the processes described in FIG. 1A and FIG. 1B.

With respect to the process described in FIGS. 1A and 1B, the source fat may comprise one or both of the animal-based fat 111 and plant-based fat 112. In one implementation, the animal-based fat 111 and/or plant-based fat 112 may be provided as yellow grease. For example, yellow grease is often referred to as used cooking oil, used vegetable oil, recycled vegetable oil, or co-product vegetable oil, which can be recovered from used frying oils from deep fryers. Yellow grease can comprise one or more of the animal-based fat 111, and vegetable-based fat 112, left over from the cooking process. As an example, yellow grease may comprise fewer contaminants than brown grease. Although yellow grease may also be a co-product material, yellow grease can also comprise a mixture of high-value hydrocarbons which may be used in the process described herein. For example, yellow grease may be utilized in one or both the processes described in FIG. 1A and FIG. 1B.

In FIG. 2, stearic acid 150 may be further distilled to remove the palmitic acid 220. The process shown in FIG. 2 includes: 1) distilling the stearic acid; and 2) removing palmitic acid from the stearic acid. The distillation process described in FIG. 2 may be referred to as the palmitic distillation 210. In one implementation, stearic acid 150 may be subjected to known fractional distillation methods to remove more of the palmitic acid from the feed stock product. As one example of fractional distillation, a typical boiling point of palmitic acid is 351.00° C., and 375.20° C. for stearic acid; thereby having a difference between boiling point of 24.2° C. Further, for example, the distillation process can occur at a variety of operating pressures, such as from 50 to 150 millibar (mbar) (e.g., or <10 to 180 mbar). Decreasing the operating pressure can have an effect on the operating temperature, or feed temperature (e.g., lower pressure~lower temperature needed). As an example, the feed temperature and feed pressure may affect the purity of the resulting stearic acid; therefore achieving the desired feed pressure can result in a desired purity. Further, differences in the boiling points of the constituents can also effect the separation efficiency.

In one implementation, the fractional distillation may yield more than about 80% palmitic acid 220 by weight. In one implementation, the palmitic distillation 210 of the stearic acid 150 described in this step may occur through a continuous process to produce palmitic acid 220. During the palmitic distillation 210, more than about 90% stearic acid by weight may be separated from the palmitic acid 220. In one implementation, stearic acid 150 may be separated from the palmitic acid 220 after the palmitic distillation 210 and provided as a separate product, as shown in FIG. 2.

Further, the stearic acid 150 and/or the palmitic acid 220 may undergo prilling 160, as described in FIGS. 1A and 1B. For example, the prilling method is similar to the methods described above; however, because palmitic acid 220 has a lower melting point that stearic acid, the injection, or spraying temperature of the palmitic acid into the prilling chamber will be lower. In one implementation, the stearic acid 150 provided after the palmitic distillation 210 may undergo prilling 160 to provide prilled stearic acid 170. In another implementation, the palmitic acid 220 provided after the palmitic distillation 210 may undergo prilling 160 to provide prilled palmitic acid 230.

In FIG. 3, stearic acid 150 may be further distilled to remove the fully hydrogenated fatty acid 320. In one implementation, fully hydrogenated fatty acid is provided from the process comprising: 1) distilling the stearic acid 150; and 2) removing fully hydrogenated fatty acid 310 from the stearic acid 150. This distillation to remove the fully hydrogenated fatty acid 320 may be referred to as the fully hydrogenated fatty acid distillation 310. Fully hydrogenated fatty acids 320 are saturated fats that contain no trans fats. In one implementation, fully hydrogenated fatty acids 320 may include at least one fatty acid of caprylic acid, capric acid, lauric acid, myristic acid, palmitic acid, stearic acid, arachidic acid, behenic acid, lignoceric acid, and cerotic acid. In another implementation, fully hydrogenated fatty acids 320 may include a combination of the following fatty acids: caprylic acid, capric acid, lauric acid, myristic acid, palmitic acid, stearic acid, arachidic acid, behenic acid, lignoceric acid, and cerotic acid.

In one implementation, stearic acid 150 may be subjected to fully hydrogenated fatty acid distillation 310 though a distillation process, for example, under a high vacuum (e.g., low operating pressure). In one implementation, the fully hydrogenated fatty acid distillation 310 may occur at a temperature at least about 400° F. (200° C.). In one implementation, a fully hydrogenated fatty acid 320 may be provided after the fully hydrogenated fatty acid distillation 310.

In one implementation, the fully hydrogenated fatty acid distillation 310 may provide fully hydrogenated fatty acid 320 that has about ninety-nine percent fully hydrogenated fatty acid 320 (e.g., ~99% saturated fatty acid). In another implementation, the fully hydrogenated fatty acid distillation 310 may provide fully hydrogenated fatty acid 320 that has about ninety-eight percent fully hydrogenated fatty acid 320 (e.g., ~98% saturated fatty acid)

Fully hydrogenated fatty acids 320 may be used as a food source or other commercial uses. In one implementation, the fully hydrogenated fatty acids 320 may be used for alternate applications (e.g., as an ingredient in food for humans). In another implementation, the hydrogenated fatty acids 320 may be used in animal feed applications.

Additionally, fully hydrogenated fatty acid 320 may be provided in prill form. This process is described herein. In one implementation, the fully hydrogenated fatty acid 320 may undergo the prilling 160 process to provide a prilled fully hydrogenated fatty acid 330.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A process for producing a stearic acid product comprising:
   deodorizing and distilling a fat;
   concentrating fatty acids of the fat; and
   hydrogenating the fatty acids resulting in a stearic acid product.

2. The process of claim 1, the stearic acid product comprises a rubber grade stearic acid.

3. The process of claim 2, the stearic acid product comprises at least 90% stearic acid.

4. The process of claim 1, the fat derived an animal source.

5. The process of claim 1, the fat derived a plant source.

6. The process of claim 1, the fat comprising a brown grease.

7. The process of claim 1, the fat comprising a yellow grease.

8. The process of claim 1, the fat comprising a yellow grease and a brown grease.

9. The process of claim 1, the fat comprising a co-products.

10. The process of claim 1, the concentrating of the fatty acid also resulting in production of a tallow fatty acid.

11. The process of claim 1 further comprising the step of prilling the stearic acid.

12. The process of claim 1 further comprising the steps of distilling the stearic acid; and
    removing palmitic acid from the stearic acid.

13. The process of claim 12 further comprising the step of prilling the palmitic acid.

14. The process of claim 1 further comprising the steps of:
    distilling the stearic acid; and
    removing fully hydrogenated fatty acid from the stearic acid.

15. The process of claim 14 further comprising the step of prilling the fully hydrogenated fatty acid.

* * * * *